United States Patent [19]

Nakajima et al.

[11] 4,220,613
[45] Sep. 2, 1980

[54] LIQUID FEEDER

[75] Inventors: Yasufumi Nakajima; Hayami Nakatani, both of Kobe, Japan

[73] Assignee: Mitsubishi Jukogyo Kabushiki Kaisha, Japan

[21] Appl. No.: 17,236

[22] Filed: Mar. 5, 1979

[30] Foreign Application Priority Data

Mar. 9, 1978 [JP]  Japan .................................. 53-26012

[51] Int. Cl.$^2$ .............................................. B01F 3/04
[52] U.S. Cl. .................................... 261/152; 55/220;
239/132; 261/115
[58] Field of Search ................................ 261/115-118,
261/152, 155, 98, 111, 151, 156, 157, DIG. 9,
DIG. 13; 55/220; 122/487; 165/60; 239/128,
132, 132.1, 132.3

[56] References Cited

U.S. PATENT DOCUMENTS

| 1,046,344 | 12/1912 | Stewart | 261/152 |
|---|---|---|---|
| 1,652,956 | 12/1927 | Purtyman | 261/115 |
| 1,673,732 | 6/1928 | Brooks | 261/115 X |
| 1,839,618 | 1/1932 | Toepfer | 261/115 |
| 1,985,010 | 12/1934 | Berkhnijsen | 261/115 |
| 3,158,666 | 11/1964 | Heller et al. | 261/118 |
| 3,233,882 | 2/1966 | Calaceto | 261/118 |
| 3,282,032 | 11/1966 | King, Jr. et al. | 261/118 X |
| 3,386,659 | 6/1968 | Rea | 239/132 |
| 3,589,611 | 6/1971 | Jones, Jr. | 239/132 |

Primary Examiner—Richard L. Chiesa
Attorney, Agent, or Firm—McGlew and Tuttle

[57] ABSTRACT

A liquid feeder comprises an assembly of chemicals-feeding nozzles, each of which is fabricated by securing wall members, having nozzle holes each, between pairs of adjacent tubes, thereby forming a boxlike nozzle. The tubes are those of a flow path or circuit through which the fluid in a boiler or preboiler unit is taken out and is returned to either unit. The liquid feeder is intended for use with various plants, especially boiler plants.

3 Claims, 13 Drawing Figures

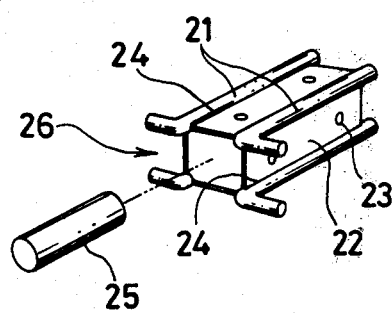
FIG. 1a
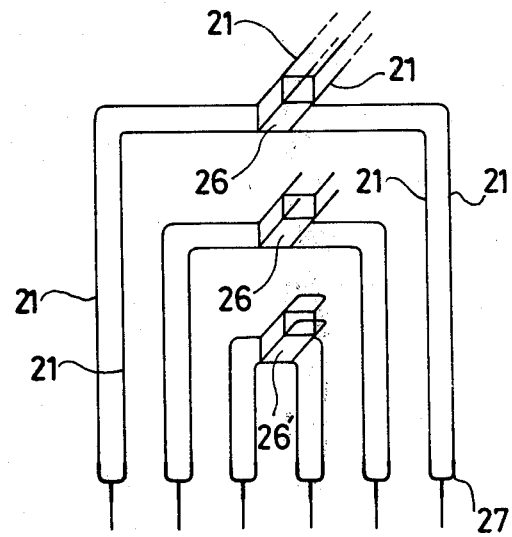
FIG. 1b
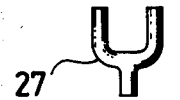
FIG. 1c
FIG. 2
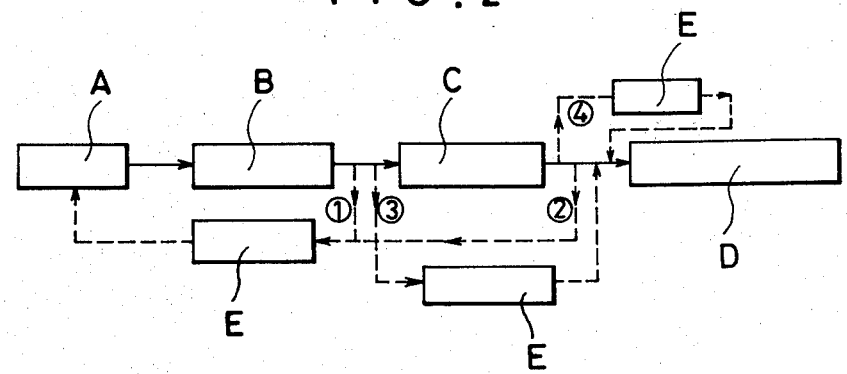

LIQUID FEEDER

FIELD AND BACKGROUND OF THE INVENTION

This invention relates to a liquid feeder for introducing a liquid into exhaust gases as the products of combustion in a boiler plant.

In order to reduce the nitrogen oxide emissions from boilers, it is necessary to install nozzles for feeding a solution of ammonia ($NH_3$) and other chemicals to the hot combustion exhaust gases. However, there has been no compact and economical feeder available which would work by itself without the aid of a special equipment installed outside the boiler unit.

SUMMARY OF THE INVENTION

The object of the present invention is to solve the above problem, and more specifically to provide a liquid feeder of a construction such that each of nozzles therefor is formed of the tubes of a preboiler or boiler unit and can be cooled by the medium used in the unit.

The liquid feeder of the invention is characterized in that wall members, each of which is formed with nozzle holes, are secured between adjacent ones of a plurality of tubes, and the wall members and the tubes are assembled together to boxlike chemicals-feeding nozzles, said tubes being in the form of a flow path or circuit through which the fluid in a boiler or preboiler unit is taken out and returned to either unit.

The liquid feeder of the invention offers advantages as follows:

(1) Since the fluid in the preboiler or boiler unit is utilized as the cooling medium, a temperature low enough to cool the chemicals-feeding nozzles is obtained. If the temperature is excessively high, decomposition of $NH_3$ and other chemicals will take place within the nozzle assembly. A too low temperature, on the other hand, can invite corrosive attacks by sulfur oxides in the combustion gases.

(2) Where the fluid (water or steam) for cooling the chemicals-feeding nozzles is that which flows within the boiler unit, there will be no adverse effect upon the turbine cycle (that is, upon the heat balance and the like of the turbine).

(3) The chemicals-feeding nozzle assembly is economical and compact without the necessity of installing any additional pump or other equipment, because it is made of, and cooled by, part or all of a system within a preboiler or boiler unit, such as the feedwater system or heat-exchange tubing system.

(4) The nozzle assembly, formed of part or all of the main system (tubes and fluid in the boiler), does not call for any special procedure or control for operation.

The liquid feeder according to the invention has extensive possible applications as such to be installed in hot gas passages, not merely of boiler plants but of other plants as well.

BRIEF DESCRIPTION OF THE DRAWINGS

Preferred embodiments of the invention will now be described with reference to the accompanying drawings, in which:

FIG. 1(a) is a perspective view of a chemicals-feeding nozzle embodying the invention, partly broken apart to show the construction;

FIG. 1(b) is a plan view of the tubes forming nozzles of the construction shown in FIG. 1(a);

FIG. 1(c) is a plan view of a Y-branch;

FIG. 2 is a block diagram indicating different circuits for cooling the chemicals-feeding nozzle assembly installed within a preboiler unit;

DESCRIPTION OF THE PREFERRED EMBODIMENTS

Figure 3:
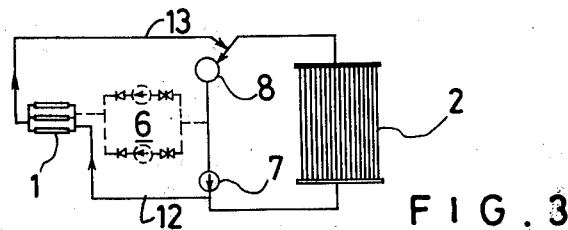
FIGS. 3 through 8 are schematic diagrams showing typical arrangements for incorporating the chemicals-feeding nozzle assembly and the circuit for cooling the assembly.

Typically, a boiler system is diagrammed as:

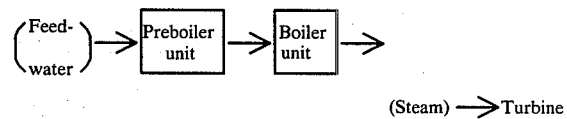

According to the present invention, the tubes of the preboiler or boiler unit are utilized to form a chemicals-feeding nozzle assembly and also a section for cooling the assembly.

The tubes for use in forming the feeding nozzle assembly jointly constitute a branch or bypass circuit since they branch off from all or part of the preboiler or boiler tubes at a desired point and then rejoin the main tubing at another point upstream or downstream.

FIGS. 1(a), (b), and (c) illustrate chemicals-feeding nozzles embodying the invention. Throughout these figures, the reference numeral 21 indicates boiler tubes. Between each pair of adjacent tubes 21 is fitted a wall member or nozzle-forming strip 22 having nozzle holes 23. These tubes 21 and the strips 22 are welded together at four corners to fabricate a boxlike chemicals-feeding nozzle 26. A chemicals duct 25 is extended from the outside of the boiler wall and is connected to the nozzle 26. [FIG. 1(a)].

The tubes 21 are branched off from part of the tubes at the center wall, each of the latter tubes being connected to a Y-branch 27, so that four branch tubes serve to form each nozzle 26. [FIG. 1(b)].

The nozzles 26 are cooled by steam that passes through the tubes 21.

In FIG. 1(b), the two adjacent tubes 21 in each pair forming the nozzle 26 are joined together by another Y-branch 27 (not shown) for reconnection to the original boiler tube.

As at 26' in FIG. 1(b), the tubes on the opposite sides of the boxlike nozzle body may be connected to each other instead of being kept separate.

The chemicals-feeding nozzle assembly of the construction above described may generally be fabricated with tubes branched off from the preboiler unit in four different ways as indicated in FIG. 2.

First, the nozzle assembly E is provided in a route ① which branches off from the discharge side of the feed pump B and extends back to the deaerator A of the preboiler system.

Second, it is located in a route ② which starts at the exit of the front feedwater heater C and returns all the way to the deaerator A.

The third route ③ bypasses the feedwater heater C by branching off from the discharge side of the feed pump B and rejoining the main line at the outlet of the heater. Fourth, the nozzle assembly is in a route ④ starting on the inlet side of the heater C and finishing on the outlet side of the rear feedwater heater or boiler D.

In case of the boiler unit, the chemicals-feeding nozzle assembly is usually built in the following ways.

(A) With a once-through boiler

The boiler unit of the once-through type consists of a line a, economizer b, line c, water-cooled furnace wall d, line e, and superheater f, in a flow sequence as diagrammatized below:

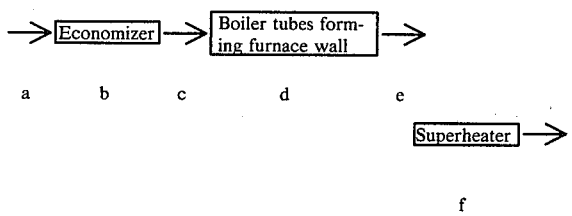

On the assumption that the components a through f can give either the branching or rejoining points of a circuitous route for the chemicals-feeding nozzle assembly, the possible combinations of the branching and rejoining points for the nozzle assembly will be as indicated by marks "0" in Table 1.

Table 1

| Rejoining point | Branching point | | | | | |
|---|---|---|---|---|---|---|
| | a | b | c | d | e | f |
| a | 0 | | | | | |
| b | 0 | 0 | | | | |
| c | 0 | 0 | 0 | | | |
| d | 0 | 0 | 0 | 0 | | |
| e | 0 | 0 | 0 | 0 | 0 | |
| f | 0 | 0 | 0 | 0 | 0 | 0 |

Note:
In the table, "⟶a", for example, represents the following route:

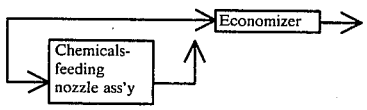

Where the branching and rejoining points in a combination differ from each other, the tubes of the main system are partly branched off and the branch tubes bypass the system to constitute a chemicals-feeding nozzle assembly and cool it.

Where the branching point coincides with the returning point, all or part of the main system tubes are branched to form a nozzle assembly.

The possible arrangements include those in which the tubes branched off at any of the points a to f return to the preboiler or starting system.

(B) With a boiler having a circuit for recirculation (natural or forced)

The boiler unit of this type generally comprises the following, as represented in a flow sequence:

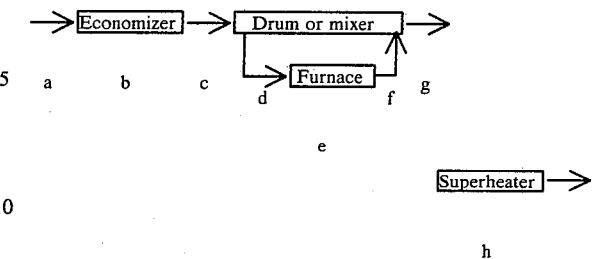

In the same manner as with Table 1, the possible combinations of branching and rejoining points are given in Table 2.

Table 2

| Rejoining point | Branching point | | | | | | | |
|---|---|---|---|---|---|---|---|---|
| | a | b | c | d | e | f | g | h |
| a | O | | | Δ | Δ | Δ | | |
| b | O | O | | Δ | Δ | Δ | | |
| c | O | O | O | Δ | Δ | Δ | | |
| d | O | O | O | O | Δ | Δ | | |
| e | O | O | O | O | O | Δ | | |
| f | O | O | O | O | O | O | | |
| g | O | O | O | O | O | O | O | |
| h | O | O | O | O | O | O | O | O |

Note:
The mark "Δ" indicates that the combination is available only for the forced circulation type.

The possible arrangements include those in which the tubes branched off at any of the points a to h are reunited to the preboiler or starting system.

Typical arrangements of the nozzle assembly and nozzle cooling system in the respective cases are illustrated in FIGS. 3 through 8.

In FIG. 3, the numeral 1 indicates a chemicals-feeding nozzle assembly; 2, a bank of evaporation tubes of the furnace; 6, a pump; 7, a boiler water circulating pump; 8, a drum; 12, a branching line of tubes for the nozzle assembly; and 13, a returning line of tubes for the assembly.

Throughout FIGS. 4 to 8, the same numerals as used in FIG. 3 designate like parts.

Figure 4:
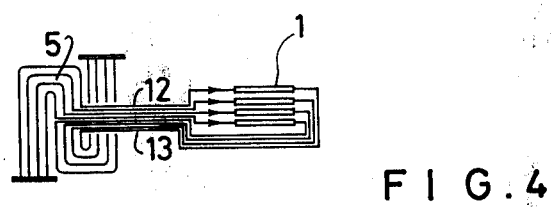
Figure 5:
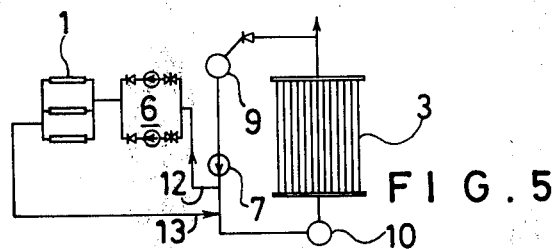

In FIG. 4, 5 is an evaporator, and in FIG. 5, 9 is a mixing drum and 10 is a distribution drum.

Figure 6:
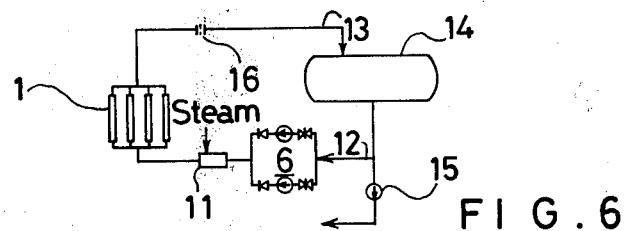

FIG. 6 shows other components; a heater 11, a deaerator 14, a boiler feed pump 15, and an orifice 16.

Figure 7:
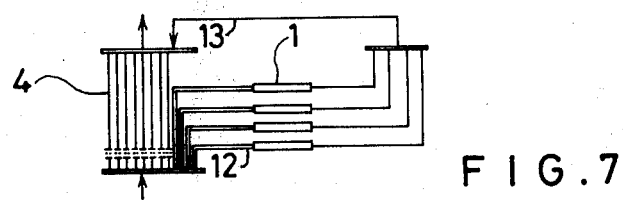
Figure 8:
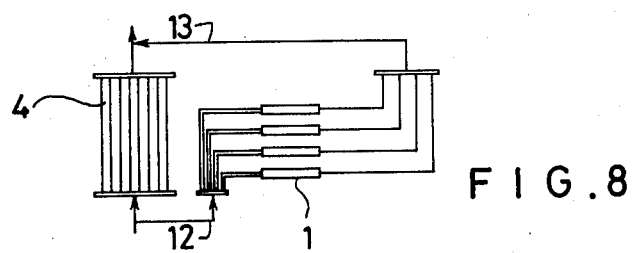

In FIGS. 7 and 8, the numeral 4 denotes a center wall tube bank.

Figure 9A:
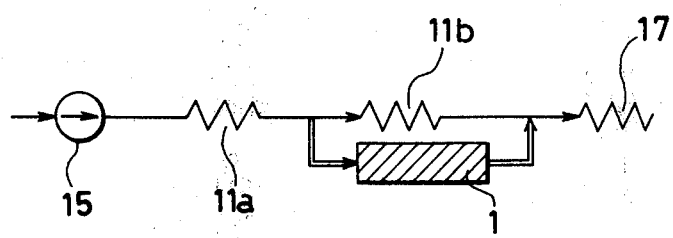
FIG. 9(a) is a diagram illustrating a cooling circuit in one embodiment of the invention.
Figure 9B:
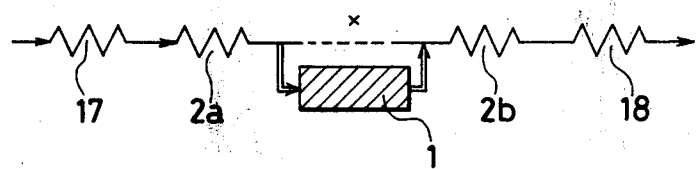
FIG. 9(b) is a diagram illustrating a cooling circuit in another embodiment of the invention.

The arrangements in FIGS. 4, 7, and 8 require no pump or heater.

Where the tubes are branched off from a preboiler unit to provide a nozzle assembly, that is, in the mode of arrangement of FIG. 6, the invention will be embodied as shown in FIG. 9(a). The chemicals-feeding nozzle assembly 1 is formed by tubes branched off from the outlet of a front high-pressure feedwater heater 11a and returned to the inlet of an economizer 17, bypassing a rear high-pressure feedwater heater 11b.

Where the tubes come from the boiler unit, or in the mode of FIG. 4, the embodiment will be as illustrated in FIG. 9(b). Here the chemicals-feeding nozzle assembly 1 is located between furnaces 2a and 2b. The numeral 18 indicates a superheater.

Figure 9C:
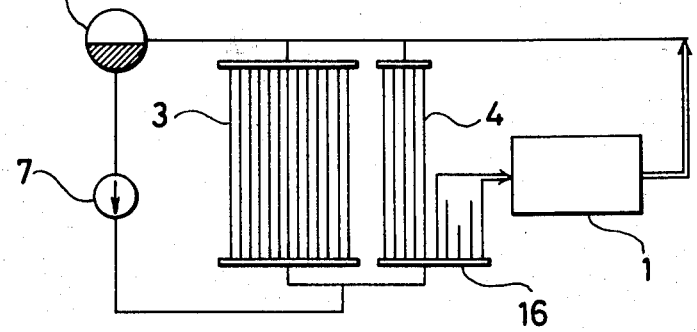
FIG. 9(c) is a schematic diagram of a cooling circuit in yet another embodiment of the invention.

A similar case of tube branching from the boiler unit, as indicated in FIG. 7, will be embodied as in FIG. 9(c). The latter figure shows the chemicals-feeding nozzle assembly 1 formed by tubes branched off from the tube bank 4 of the furance center wall. Also shown are a furnace wall tube bank 3, a circulating pump 7, a drum 8, and an orifice 16.

With the arrangements above described, the present invention presents the following advantages:

(1) In consideration of the ambient temperature of the location where the chemicals-feeding nozzle assembly is installed, the nozzle assembly is cooled to a desired temperature level by water or steam at a temperature within the desired range. In this way high temperature failure and low temperature corrosion can be prevented.

(2) Because the main circuit of the boiler system is utilized, positive circulation of the cooling medium is ensured during the boiler operation. The cooling medium (water or steam) in the desired, appropriate temperature range is made available without the addition of any special device for that purpose. The nozzle assembly is therefore economical and compact in construction.

What is claimed is:

1. A liquid feeder for feeding liquid into a boiler or preboiler having tubes for carrying a cooling fluid, comprising an assembly of chemicals feeding nozzles, each of which is fabricated by securing wall members, each having nozzle holes between pairs of adjacent ones of said tubes, thereby forming a boxlike nozzle for the passage of the liquid, said tubes being those of a flow path or circuit through which the fluid in the boiler or preboiler unit is taken out and is returned thereto.

2. A liquid feeder according to claim 1, in which each said tube for each said nozzle is bifurcated by a branch piece and the two branch tubes are bent to form four tube portions with which to fabricate each said chemicals-feeding nozzle.

3. A liquid feeder for feeding liquid into a boiler or preboiler having a plurality of lengths of tubes for carrying a fluid therein comprising, a plurality of wall members each connected between pairs of adjacent ones of said lengths of tubes each wall member having at least one nozzle hole therein for discharge of liquid, said plurality of wall members and connected lengths of tubes defining a boxlike construction for the passage of the liquid, whereby the fluid carried in the lengths of tubes acts to cool the liquid feeder.

* * * * *